W. B. JOHNS.
Apparatus for Treating Offal.

No. 148,107. Patented March 3, 1874.

Witnesses.
Chas. B. Collier
W. B. Johns

Inventor.
Wm Burr Johns.
by J. Snowden Bell
atty.

UNITED STATES PATENT OFFICE.

WILLIAM BURR JOHNS, OF PHILADELPHIA, PENNSYLVANIA.

IMPROVEMENT IN APPARATUS FOR TREATING OFFAL.

Specification forming part of Letters Patent No. 148,107, dated March 3, 1874; application filed January 28, 1874.

*To all whom it may concern:*

Be it known that I, WILLIAM BURR JOHNS, of the city and county of Philadelphia, in the State of Pennsylvania, have invented certain new and useful Improvements in Apparatus for Treating Bones and other Animal Matters, of which the following is a specification:

My present invention is designed to provide a simple, compact, and economical apparatus for digesting and drying bones, horns, hoofs, blood, hair, flesh, or other animal matters, for the purpose of rendering the same perfectly friable and pulverizable, in order that they may be readily ground for the manufacture of fertilizers, while retaining their ammonia and other valuable constituents, the process being conducted and completed in one continuous and entire operation. Letters Patent of the United States were granted to me for such process, being dated February 14, 1871, and numbered 111,851, and the apparatus herein set forth is especially adapted to fulfill the requirements thereof conveniently, expeditiously, and economically; to which end my improvements consist in the combination of a horizontal revolving chamber with a jacket surrounding the same, and cross-flues opening into the jacket, and passing through the chamber, which is provided with proper doors for the insertion and removal of the material to be treated, and with cocks or valves for supplying steam thereto, as required. The chamber and jacket are further provided with blow-off cocks for the release of the moisture driven off from the material, and of condensed steam, all as hereinafter more fully set forth.

Figure 1:
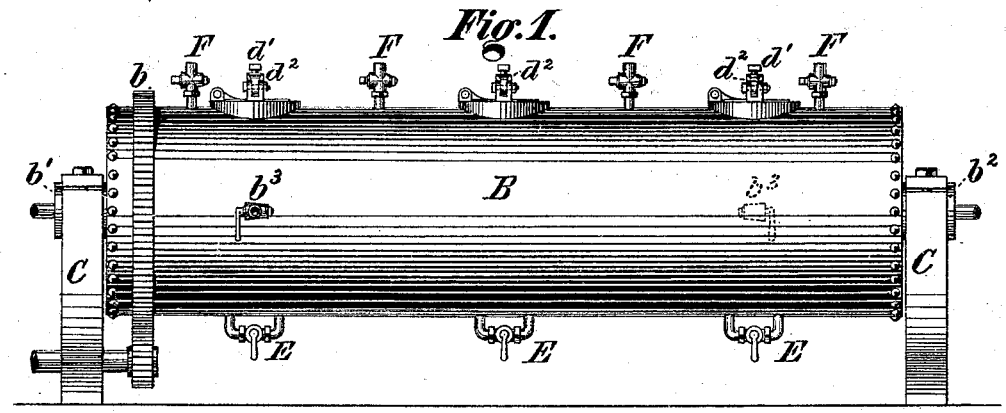
Figure 2:
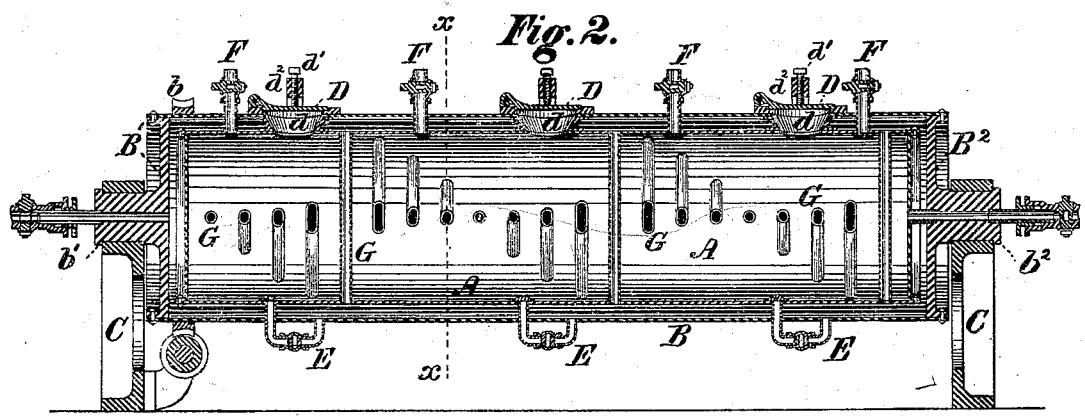

In the accompanying drawings, Figure 1 is a view, in elevation, of an apparatus for treating bones and other animal matters embodying my improvements; Fig. 2, a vertical longitudinal central section of the same; and Fig. 3, a vertical transverse section of the same at the line $x\ x$ of Fig. 2.

Figure 3:
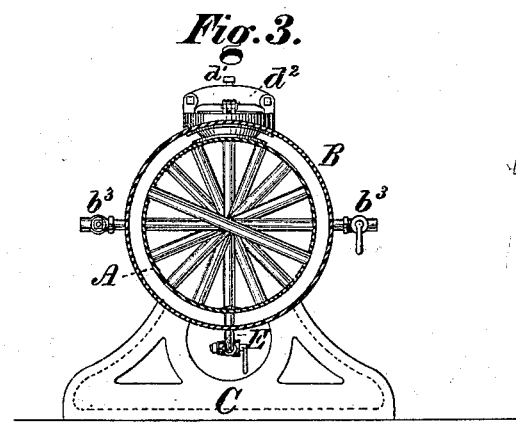

The treating-chamber A is a cylindrical metallic vessel, made of strength sufficient to withstand a high pressure of steam—say from sixty to eighty pounds to the square inch—and inclosed within an outer chamber or jacket, B, which is similarly constructed. The chambers A and B are united by socket-bolts, screw-stays, or other suitable connections, and are so placed relatively to each other that a space will be left between them for the circulation of steam around and at the ends of the inner chamber. The ends of the outer chamber are closed by substantial heads $B^1$ $B^2$, upon which, respectively, are formed the trunnions $b^1\ b^2$, concentric with the chamber B; or the trunnions may be made separately and secured to the heads, if preferred. The trunnions rest and rotate in bearings or standards C C, secured to the floor or foundation upon which the apparatus is placed. A gear, $b$, is secured upon the periphery of the outer chamber B, near one of its ends, and may be either a spur-wheel, as shown in Fig. 1, or a worm-wheel, as in Fig. 2, according to the direction in which it is found most convenient to apply power from a prime mover for the rotation of the apparatus. A central passage is formed in the trunnion $b^1$, which connects with a pipe passing into a stuffing-box communicating with a steam-generator, and a similar passage is formed in the trunnion $b^2$, connecting at one end with a short pipe leading into the treating-chamber A, and at the other with a pipe which communicates with a stuffing-box, from which a blow-off pipe is led to a proper distance. The communication between the trunnions and the steam-generator and outer air, respectively, is opened and closed, as required, by suitable cocks or valves. Blow-off cocks $b^3$ are connected to the chamber B to carry off the steam and condensed water therefrom, as may be required. Openings are formed in the outer chamber B, which communicate, by casings $d$, with openings in the chamber A, and are closed by hinged doors D, which fit so as to be steam-tight in their respective positions. The doors D serve for the introduction and removal of the material, and, moreover, when partially opened, afford additional facilities for the escape of moisture therefrom during the drying portion of the operation. They may be clamped firmly in position by means of screws $d^1$ passing through hinged bars $d^2$, and which can be screwed down to a bearing, as required. The openings of the doors D should be covered by a perforated plate to prevent the escape of material when the doors are partially opened. Pipes E, each fitted with a cock or valve, lead from the outer to the inner chamber for the purpose of supplying steam to act upon the material contained in the latter. The openings of these pipes into the inner chamber should be covered by perforated plates or strong wire-gauze to prevent any material from falling into and clogging them. Blow-off pipes F lead from the inner chamber, through the jacket, to the exterior of the apparatus, each being governed by a proper cock or valve, for the purpose of permitting the escape of the steam and water from the material after the operation of digestion has been concluded. The inner openings of these pipes should be protected similarly to those of the pipes E. The chamber A is provided with a series of cross-flues, G, passing transversely through it, and opening at each end into the space between the inner and outer chambers. These flues are arranged, by preference, spirally in the chamber, as shown in Figs. 2 and 3, being distributed equally, as near as may be, throughout its length, and serve the double purpose of providing a greatly-increased amount of heating-surface in contact with the material to be treated, and of acting as agitators to break up the lumps or masses of the same by the action of gravity when the apparatus is rotated. A series of longitudinal flues might also be applied to the chamber B, if deemed expedient; but, for simplicity and economy, I prefer the arrangement shown and described. The outer cylinder B should be clothed with some suitable non-conductor to prevent the escape of heat.

The operation of the apparatus is as follows: The hinged bars $d^2$ being raised at one end, the doors D are opened, and the material to be treated is placed in the chamber A. The doors D are then closed and clamped down, and, in cases where the material is to be first digested, the cocks in the pipes E are opened, and, steam being admitted through the trunnion $b^1$, the apparatus is slowly rotated. The steam from the generator, by preference to be superheated, then passes into the chamber A, and, coming in contact with the material therein, reduces without destroying its cohesiveness. This part of the operation usually requires, at the utmost, only about two hours. Bone, meat, tankings, flesh, &c., require from twenty minutes to one hour. The blow-off cocks should be left partially open to allow a proper circulation and escape of steam. The digesting process having been completed, the cocks in the pipes E are closed, and the blow-off cocks in the pipes F, and that connected with the trunnion $b^2$, are opened. The doors D are also slackened, so as to further facilitate the escape of vapor from the chamber A, from the interior of which steam is shut off by the closing of the cocks in the pipes E. The rotation of the apparatus being continued, the hot steam, acting upon the material in the chamber A by its contact with the periphery and ends thereof, as well as its passage through the cross-flues therein, thoroughly dries the material, this part of the operation being completed in from one and a half to three hours. The hot cross-flues G act as agitators as well as driers, the action of gravity and the rotary motion of the apparatus causing them to constantly divide the material in the chamber A.

Animal matter treated in the manner described becomes very friable without losing any of its valuable constituents, and can be readily ground in a proper mill.

My improved apparatus is simple in its construction and operation, and can be readily made by any competent boiler-maker. Its dimensions will vary with the amount of material required to be treated in a given time, and its strength must, of course, be proportionate to the pressure of steam employed. It is obvious that other than animal matters can be treated in the same apparatus, if desirable.

I am aware that a jacketed chamber for drying animal matters by the heat of steam applied to its exterior has been heretofore known, and do not, therefore, broadly claim such device.

I claim as my invention—

1. In an apparatus for treating animal or other substances, the combination of an inner treating-chamber, an outer chamber or jacket, and a series of cross-flues passing through the inner chamber, and open at each end to the outer chamber, substantially as set forth.

2. In an apparatus for treating animal or other substances, the combination of a treating-chamber, A, an outer chamber, B, and a pipe or series of pipes, E, each furnished with a cock or valve, for conveying steam from the outer chamber to the treating-chamber, or shutting it off therefrom, substantially as set forth.

WM. B. JOHNS.

Witnesses:
J. SNOWDEN BELL,
W. B. JOHNS, Jr.